United States Patent
Wakayama et al.

(10) Patent No.: US 12,346,006 B2
(45) Date of Patent: Jul. 1, 2025

(54) CAMERA

(71) Applicants: NIDEC COPAL CORPORATION, Tokyo (JP); FUJIFILM CORPORATION, Tokyo (JP)

(72) Inventors: Tomihiro Wakayama, Tokyo (JP); Hisashi Tasaka, Tokyo (JP)

(73) Assignees: NIDEC COPAL CORPORATION, Tokyo (JP); FUJIFILM CORPORATION, Tokyo (JP)

( * ) Notice: Subject to any disclaimer, the term of this patent is extended or adjusted under 35 U.S.C. 154(b) by 586 days.

(21) Appl. No.: 17/786,534

(22) PCT Filed: Dec. 9, 2020

(86) PCT No.: PCT/JP2020/045792
§ 371 (c)(1),
(2) Date: Jun. 17, 2022

(87) PCT Pub. No.: WO2021/125001
PCT Pub. Date: Jun. 24, 2021

(65) Prior Publication Data
US 2023/0039332 A1 Feb. 9, 2023

(30) Foreign Application Priority Data
Dec. 19, 2019 (JP) ................. 2019-228884

(51) Int. Cl.
*G03B 17/04* (2021.01)
(52) U.S. Cl.
CPC .................... *G03B 17/04* (2013.01)
(58) Field of Classification Search
CPC ..................................................... G03B 17/04
(Continued)

(56) References Cited

U.S. PATENT DOCUMENTS 4,146,320 A * 3/1979 Schrader ............... G03B 17/04
396/347
4,506,966 A 3/1985 Kuge
(Continued)

FOREIGN PATENT DOCUMENTS

JP 2001147461 A 5/2001
JP 201456009 A 3/2014

OTHER PUBLICATIONS

International Search Report in PCT/JP2020/045792, mailed Mar. 2, 2021. 4pp.
(Continued)

*Primary Examiner* — Leon W Rhodes, Jr.
(74) *Attorney, Agent, or Firm* — HAUPTMAN HAM, LLP

(57) ABSTRACT

A camera prevents a lens barrel from extending accidentally upon receiving, for example, an external impact. A camera includes a barrel having a guide groove extending in X-direction, a lens barrel including an engagement protrusion protruding radially outward and engaged with the guide groove on the barrel, a switch spring extending between a spring engagement portion and the engagement protrusion, a drive lever rotatable about a lever shaft, a stopper rotatable about a stopper shaft in the drive lever, and a stopper urging spring urging the stopper. The drive lever includes a pusher that pushes the engagement protrusion in the positive X-direction and a rotation restrictor that restricts rotation of the stopper. The stopper includes a restraint portion that is to be on a path of the engagement protrusion to restrain movement of the engagement protrusion in the positive X-direction when the drive lever is at an initial position.

13 Claims, 14 Drawing Sheets

(58) Field of Classification Search
USPC .......................................................... 396/349
See application file for complete search history.

(56) References Cited

U.S. PATENT DOCUMENTS 6,621,988 B2 * 9/2003 Takagi ..................... G03B 9/02
396/257
2008/0049325 A1 2/2008 Hirai

OTHER PUBLICATIONS

Extended European Search Report in EP Application No. 20902249.0 dated Dec. 15, 2023. 8pp.

* cited by examiner

CAMERA

RELATED APPLICATIONS

The present application is National stage of application No. PCT/JP2020/045792, filed on Dec. 9, 2020, and claims priority based on Japanese Patent Application No. 2019-228884, filed Dec. 19, 2019.

FIELD

The present invention relates to a camera, and particularly, to a camera including a lens barrel that is extendable frontward in an optical axis direction.

BACKGROUND

A known camera includes a lens barrel extension assembly for allowing a lens barrel to extend frontward in an optical axis direction (refer to, for example, Patent Literature 1). The lens barrel extension assembly reverses the direction in which the lens barrel is urged by a spring depending on the position of the lens barrel in the optical axis direction. When the camera is not in use, the lens barrel is urged by the spring rearward and accommodated in a camera body. When the camera is in use, the lens barrel moves frontward in response to the operation button being depressed by a user. This reverses the urging direction of the spring and causes the lens barrel to extend frontward under the urging force from the spring.

The lens barrel can move in the optical axis direction accidentally upon receiving, for example, an external impact when the camera is not in use. In this case, the lens barrel may move frontward beyond a point at which the urging direction of the spring is reversed. This reverses the urging direction of the spring, causing the lens barrel to extend frontward with the lens barrel extension assembly. In this case, the lens barrel accidentally extending frontward may come in contact with an object nearby and may break.

Such a camera typically includes a switch assembly for turning on the camera in response to the lens barrel extending frontward. When the lens barrel extends frontward upon receiving, for example, an external impact as described above, the camera can be accidentally turned on, thus consuming the battery without being noticed by the user.

CITATION LIST

Patent Literature

Patent Literature 1: Japanese Unexamined Patent Application Publication No. 2014-56009

BRIEF SUMMARY

Technical Problem

In response to the above issue, one or more aspects of the present invention are directed to a camera that prevents a lens barrel from extending accidentally upon receiving, for example, an external impact.

Solution to Problem

A camera according to one aspect of the present invention prevents a lens barrel from extending accidentally upon receiving, for example, an external impact. The camera includes a barrel having a guide groove extending in an optical axis direction, and a lens barrel accommodated in the barrel in a retracted state and movable in an extension direction parallel to the optical axis direction. The lens barrel includes an engagement protrusion protruding radially outward and engaged with the guide groove on the barrel. The camera further includes a switch spring extending between a spring engagement portion in the barrel and the engagement protrusion on the lens barrel, a drive lever rotatable about a lever shaft in the barrel, a stopper rotatable about a stopper shaft in the drive lever, a stopper urging spring urging the stopper in a stopper urging direction, an operation member movable in an operation direction, and a button urging spring urging the operation member in a direction opposite to the operation direction. The operation member moves in the operation direction to rotate the drive lever at an initial position in a driving direction. The switch spring urges the engagement protrusion on the lens barrel in the extension direction when the engagement protrusion on the lens barrel is at a position farther in the extension direction than a reference position, and urges the engagement protrusion on the lens barrel in a retraction direction opposite to the extension direction when the engagement protrusion on the lens barrel is at a position farther in the retraction direction than the reference position. The drive lever includes a pusher that pushes the engagement protrusion on the lens barrel in the extension direction and a rotation restrictor that restricts rotation of the stopper in the stopper urging direction. The pusher in the drive lever pushes the engagement protrusion on the lens barrel in the extension direction to move the engagement protrusion farther in the extension direction than the reference position as the drive lever rotates in the driving direction in response to the operation member being depressed. The stopper includes a restraint portion that is to be on a path of the engagement protrusion on the lens barrel along the guide groove on the barrel to restrain movement of the engagement protrusion on the lens barrel in the extension direction when the drive lever is at the initial position.

DETAILED DESCRIPTION

Figure 1:
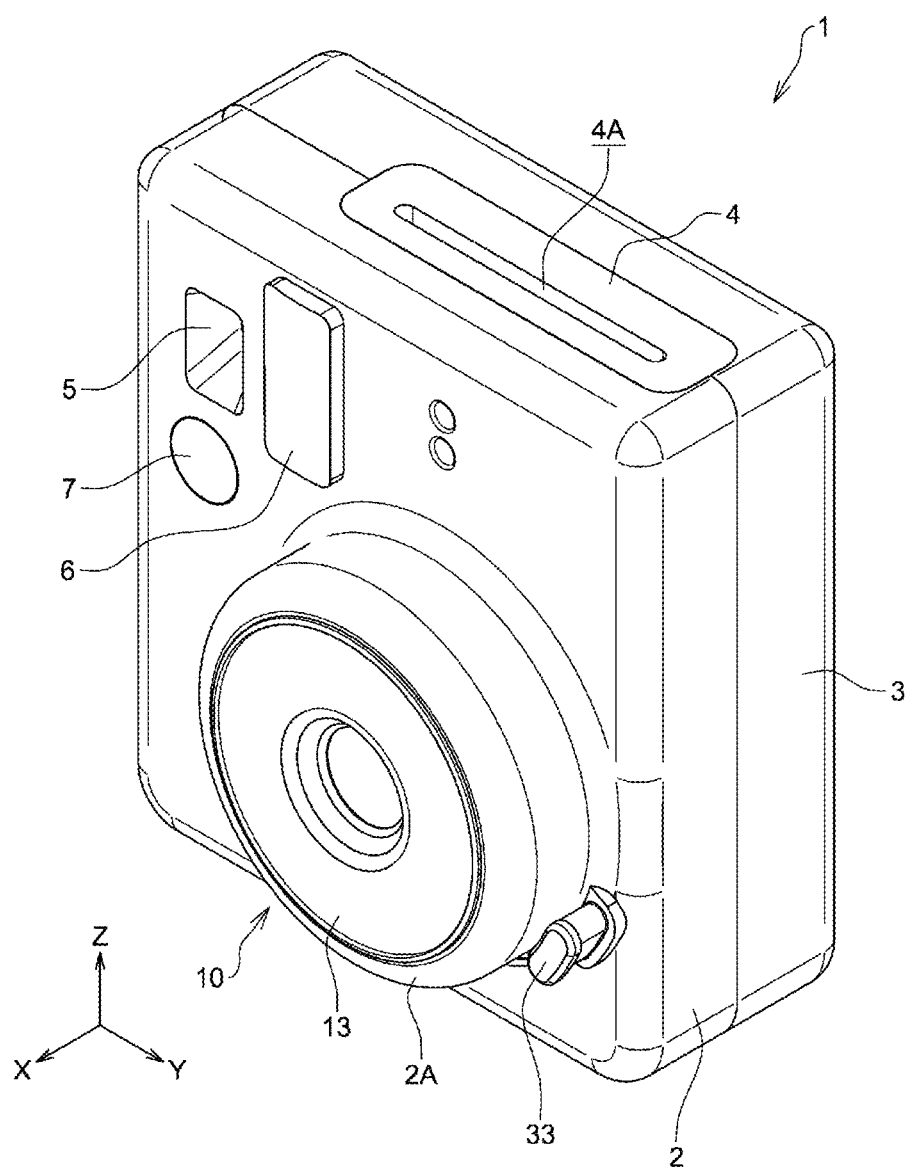
FIG. 1 is a perspective view of a camera according to one embodiment of the present invention.

A camera according to one or more embodiments of the present invention will now be described in detail with reference to FIGS. 1 to 9F. In FIGS. 1 to 9F, like reference numerals denote like or corresponding components. Such components will not be described repeatedly. In FIGS. 1 to 9F, the scale and dimensions of each component may be exaggerated, or one or more components may not be shown.

FIG. 1 is a perspective view of a camera 1 according to one embodiment of the present invention. Although the camera 1 according to the present embodiment is a camera (instant camera) that uses a photographic film to be automatically developed after shooting, the present invention is also applicable to a camera other than such an instant camera. For ease of explanation in the present embodiment, the term front or frontward refers to the positive X-direction in FIG. 1, and the term rear or rearward refers to the negative X-direction in FIG. 1.

As shown in FIG. 1, the camera 1 includes a front cover 2, a rear cover 3 attached to the rear of the front cover 2, and a top cover 4 sandwiched between the front cover 2 and the rear cover 3. The front cover 2 has a viewfinder 5. A flash window 6 is located adjacent to the viewfinder 5. A release button 7 is located in the negative Z-direction from the viewfinder 5. The top cover 4 has an ejection slit 4A extending in Y-direction, from which a photographic film developed after shooting is ejected.

Figure 2:
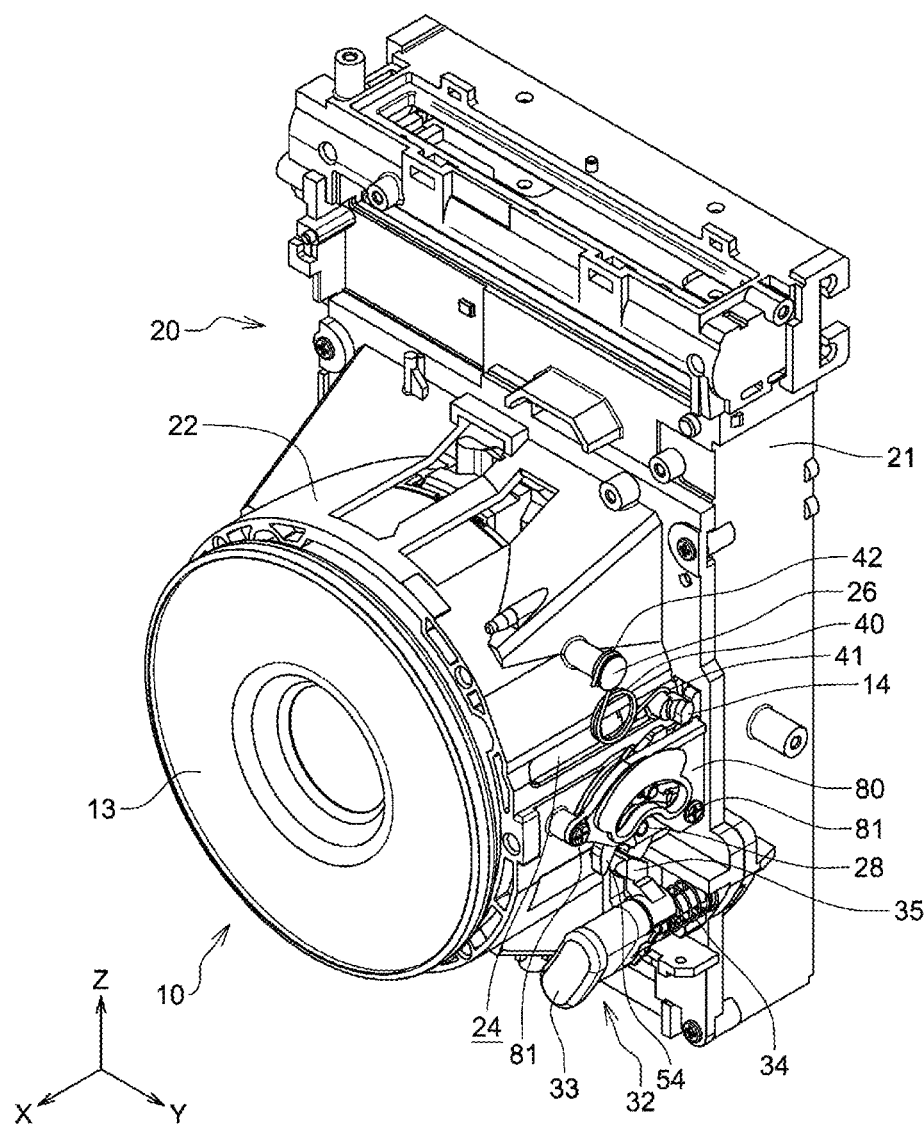
FIG. 2 is a perspective view of some of the components accommodated in an internal space defined by a front cover, a rear cover, and a top cover in the camera shown in FIG. 1.
Figure 3:
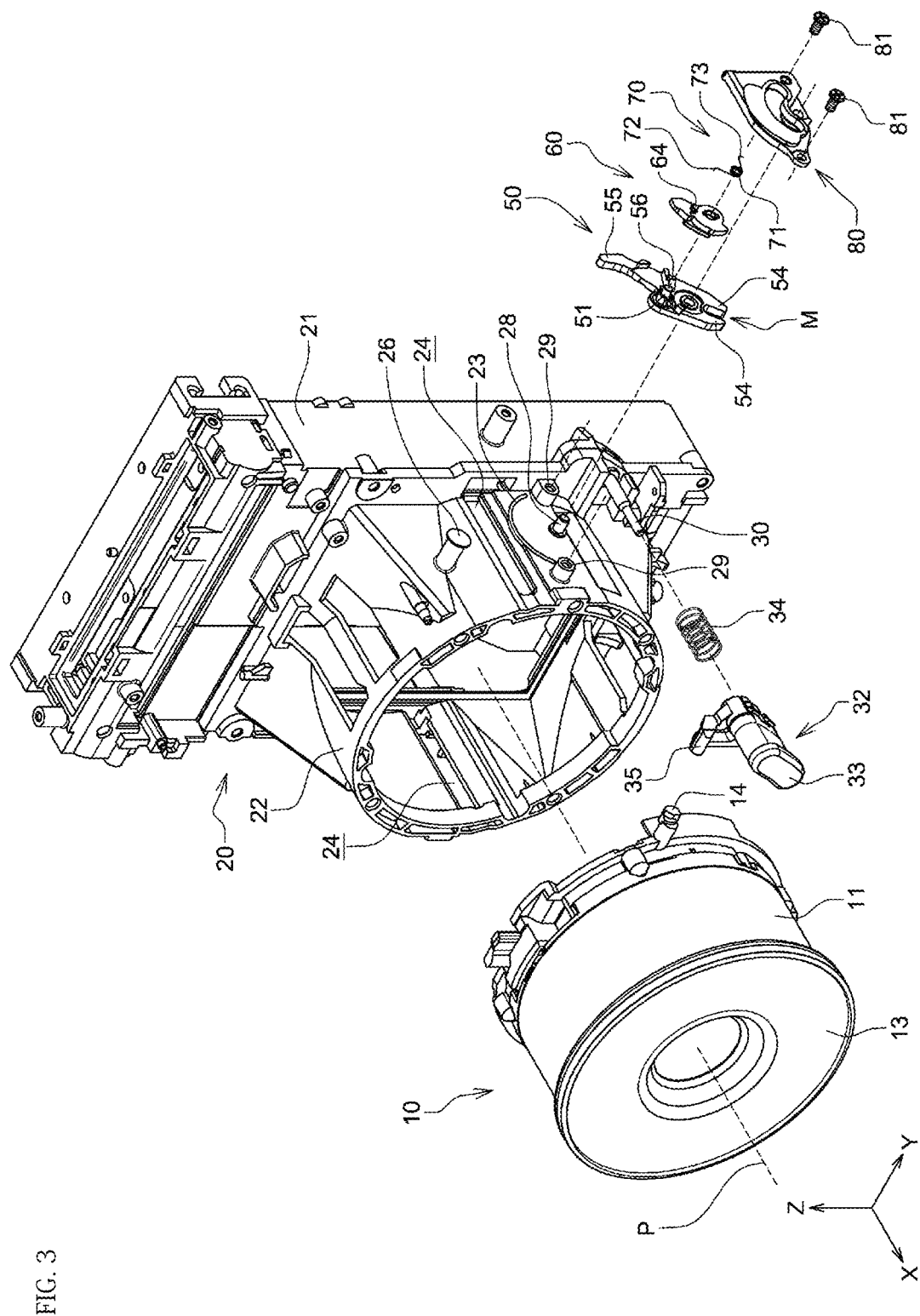
FIG. 3 is an exploded perspective view of some of the components of the camera shown in FIG. 1.

FIG. 2 is a perspective view of some of the components accommodated in an internal space defined by the front cover 2, the rear cover 3, and the top cover 4. FIG. 3 is an exploded perspective view of some of the components of the camera 1. As shown in FIGS. 2 and 3, the camera 1 includes a lens barrel 10 accommodated in a cylindrical portion 2A of the front cover 2 (refer to FIG. 1) and a frame 20 to which the lens barrel 10 is attached. The frame 20 includes a substantially rectangular base 21 and a cylindrical barrel 22 extending frontward from the base 21 and holding the lens barrel 10.

As shown in FIG. 3, a guide shaft 30 extending in the positive X-direction is located adjacent to the barrel 22 in the frame 20. The guide shaft 30 receives an operation button 32 (operation member) on its distal end. The operation button 32 includes a button body 33 and a hook 35 (lever engagement portion) on the rear end of the button body 33. A button urging spring 34 is compressed between the rear end surface of the operation button 32 and the front surface of the base 21 in the frame 20. The operation button 32 is thus urged by the button urging spring 34 in the positive X-direction (button urging direction).

As shown in FIG. 1, the button body 33 in the operation button 32 protrudes from the front cover 2 in the positive X-direction near the cylindrical portion 2A of the front cover 2. A user can depress the operation button 32 in the negative X-direction (operation direction) against the urging force from the button urging spring 34. In the illustrated example, the button urging spring 34 is a coil spring, but may be another spring.

Figure 4:
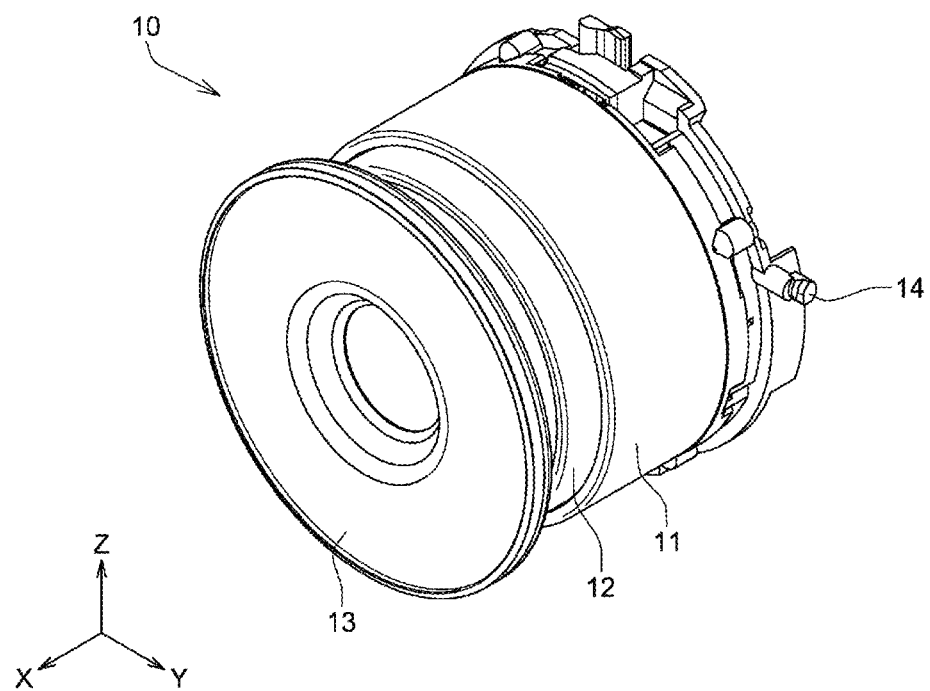
FIG. 4 is a perspective view of a lens barrel shown in FIG. 3 extending to its maximum length in the positive X-direction.

The lens barrel 10 in the present embodiment is extendable in the positive X-direction. FIG. 4 is a perspective view of the lens barrel 10 extending to its maximum length in the positive X-direction. As shown in FIG. 4, the lens barrel 10 includes a first cylinder 11, a second cylinder 12, and a third cylinder 13. The first cylinder 11 is movable in X-direction relative to the barrel 22 in the frame 20. The second cylinder 12 is movable in X-direction relative to the first cylinder 11. The third cylinder 13 is movable in X-direction relative to the second cylinder 12.

In FIG. 2, the lens barrel 10 is accommodated in the barrel 22 in the frame 20 and has a minimum length in X-direction. This state is hereafter referred to as a retracted state. When the user depresses the operation button 32 in the negative X-direction in the retracted state, the lens barrel 10 is extended by a lens barrel extension assembly (described later) in the positive X-direction (extension direction), protruding from the barrel 22 in the frame 20 in the positive X-direction. In response to the lens barrel 10 protruding from the barrel 22 in the positive X-direction, a switch assembly (not shown) turns on the camera 1.

Figure 5:
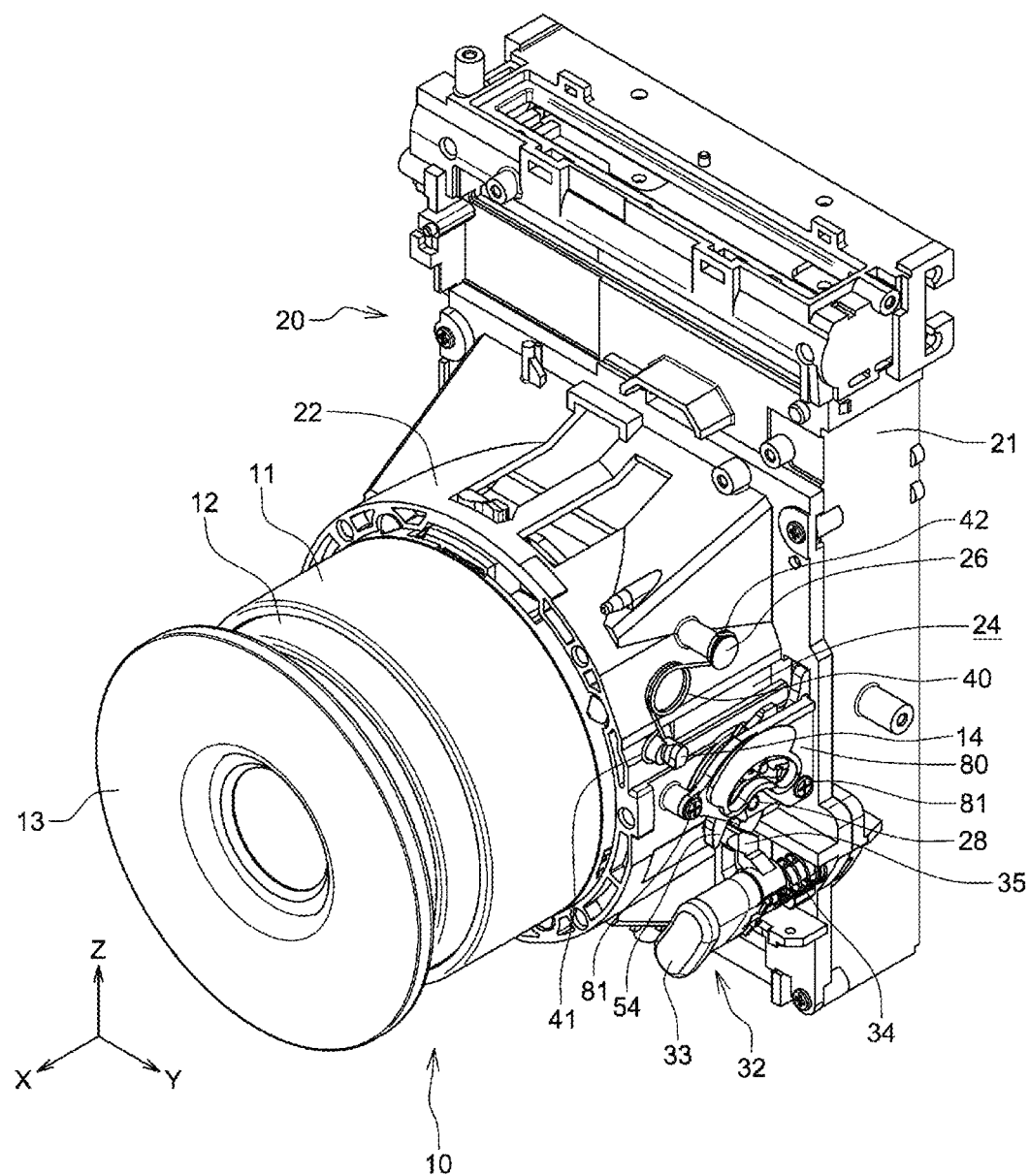
FIG. 5 is a perspective view of the lens barrel included in the camera shown in FIG. 1 at an extended position.

In the present embodiment, the second cylinder 12 moves in the positive X-direction relative to the first cylinder 11 in the process in which the lens barrel 10 moves in the positive X-direction. After the first cylinder 11 and the second cylinder 12 in the lens barrel 10 move in the positive X-direction, the user may pull the third cylinder 13 from the second cylinder 12 further in the positive X-direction for, for example, macro photographing. FIG. 5 is a perspective view showing this state.

The lens barrel extension assembly for allowing the lens barrel 10 to extend in the positive X-direction (extension direction) will now be described. As shown in FIG. 3, the barrel 22 in the frame 20 has two guide grooves 24 extending in the direction of an optical axis P (X-direction). The lens barrel 10 includes, on the rear edge of the first cylinder 11, engagement protrusions 14 corresponding to the guide grooves 24 and protruding radially outward. As shown in FIGS. 2 and 5, each engagement protrusion 14 on the lens barrel 10 is received in and engaged with the guide groove 24 on the barrel 22. The guide grooves 24 each have a width in Z-direction slightly larger than the width of the engagement protrusion 14 in Z-direction. The engagement protrusions 14 are thus movable in the direction of the optical axis P (X-direction) in the guide grooves 24 while being guided by the guide grooves 24. In the present embodiment, one of the two engagement protrusions 14 is moved in the positive X-direction by the lens barrel extension assembly including a drive lever 50 and a stopper 60 (described later), and the other engagement protrusion 14 also moves in the positive X-direction accordingly while being guided by the guide groove 24.

As shown in FIGS. 2 and 5, the engagement protrusion 14 on the lens barrel 10 extends through the guide groove 24 on the barrel 22 and outward from the barrel 22. The engagement protrusion 14 is engaged with one arm 41 of a switch spring 40 being, for example, a helical torsion spring on its distal end. The barrel 22 in the frame 20 includes a pin-shaped spring engagement portion 26. The spring engagement portion 26 is engaged with another arm 42 of the switch spring 40. More specifically, the switch spring 40 described above extends between the engagement protrusion 14 on the lens barrel 10 and the spring engagement portion 26 in the barrel 22. In the illustrated example, the switch spring 40 is a helical torsion spring, but may be another spring (e.g., a leaf spring).

As shown in FIG. 3, the barrel 22 includes a lever shaft 28 extending radially outward. The lever shaft 28 receives the elongated drive lever 50 in a manner rotatable about the lever shaft 28. The drive lever 50 includes a stopper shaft 51 extending in the positive Y-direction. The stopper shaft 51 receives the substantially sector-shaped stopper 60 in a manner rotatable about the stopper shaft 51. The drive lever 50 and the stopper 60 are held between the barrel 22 and a cover plate 80 attached to the barrel 22. The cover plate 80 is fixed with screws 81 screwed into threaded holes 29 in the barrel 22.

Figure 6A:
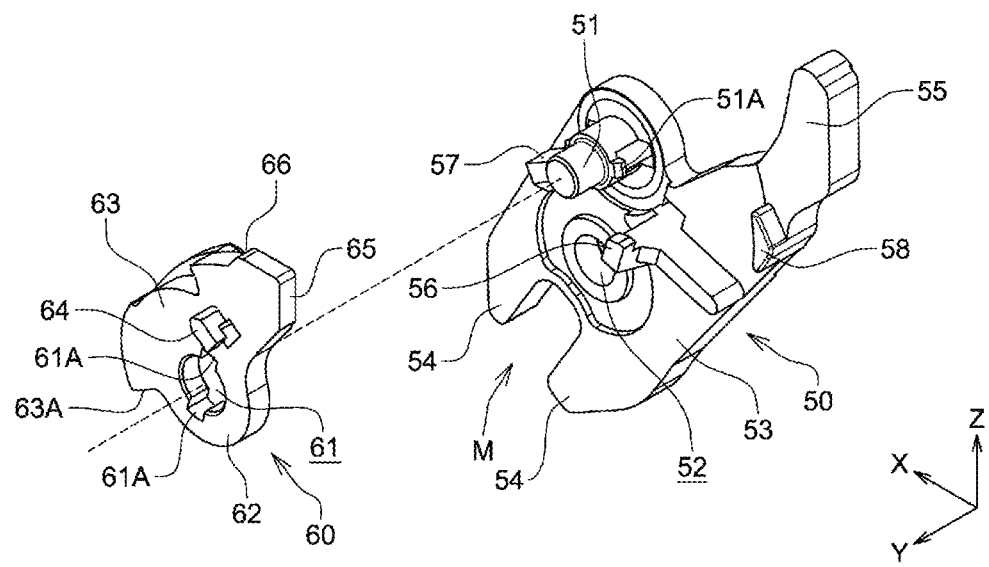
FIG. 6A is an exploded perspective view of a drive lever and a stopper shown in FIG. 3.
Figure 6B:
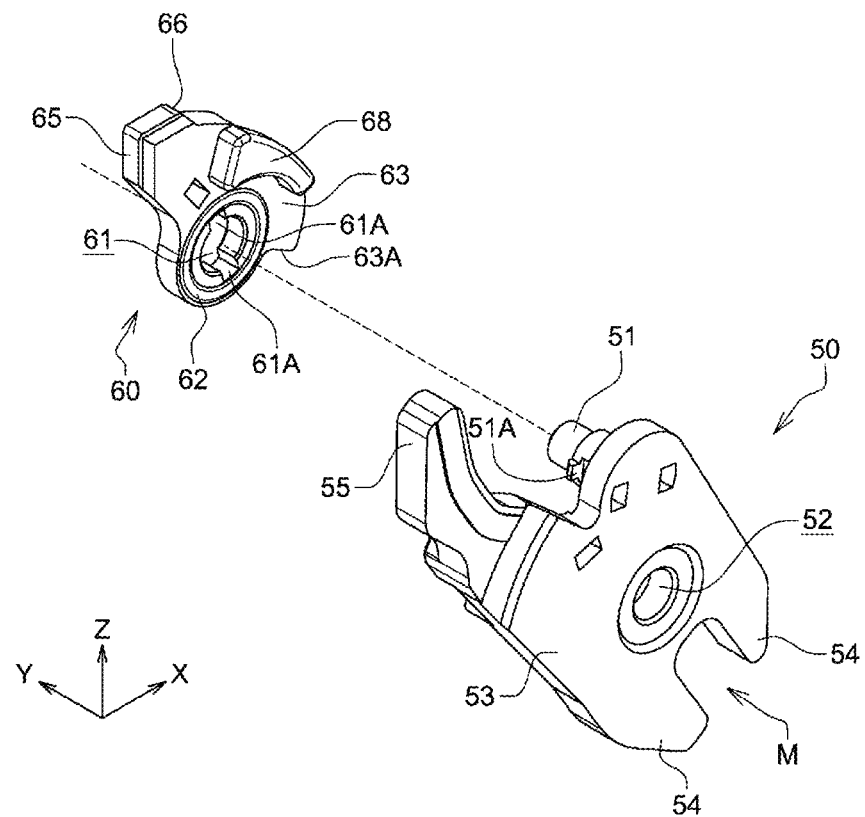
FIG. 6B is an exploded perspective view of the drive lever and the stopper shown in FIG. 3.
Figure 7:
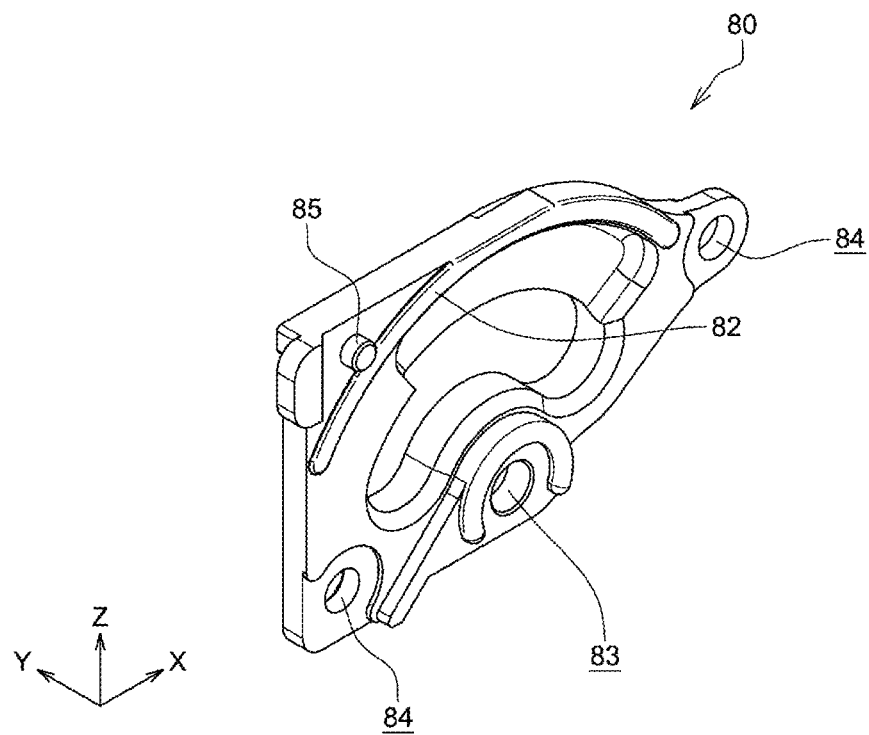
FIG. 7 is a perspective view of a cover plate shown in FIG. 3.

FIGS. 6A and 6B are exploded perspective views of the drive lever 50 and the stopper 60. FIG. 7 is a perspective view of the cover plate 80. As shown in FIGS. 6A and 6B, the drive lever 50 includes a lever body 53, a pair of holding pieces 54, a pusher 55, an engagement tab 56, and a rotation restrictor 57. The lever body 53 has a shaft hole 52 for receiving the lever shaft 28 described above. The holding pieces 54 extend from the lever body 53. The pusher 55 extends from the lever body 53 opposite to the holding pieces 54. The engagement tab 56 is located in the positive Y-direction from the lever body 53. The rotation restrictor 57 protrudes from the lever body 53 in the positive Y-direction and restricts rotation of the stopper 60. The stopper shaft 51 described above extends from the lever body 53 in the positive Y-direction between the engagement tab 56 and the rotation restrictor 57. The stopper shaft 51 includes, at intervals of 180 degrees, two keys 51A protruding radially outward.

As shown in FIG. 7, the cover plate 80 includes an arc-shaped rail 82, a shaft hole 83 for receiving the stopper shaft 51 in the drive lever 50, threaded holes 84 for receiving the screws 81 (refer to FIG. 3), and a stopper engagement portion 85 engageable with the stopper 60. As shown in FIG. 6A, the drive lever 50 includes a plate slider 58 that slides along the rail 82 in the cover plate 80.

As shown in FIG. 3, a groove M between the pair of holding pieces 54 in the drive lever 50 receives the hook 35 in the operation button 32. The hook 35 in the operation button 32 is engaged with the holding pieces 54 in the drive lever 50. When the user depresses the operation button 32 in the negative X-direction (operation direction), the hook 35 in the operation button 32 pushes the drive lever 50 in the negative X-direction, thus causing the drive lever 50 to rotate about the lever shaft 28 (counterclockwise in FIG. 2). The direction in which the drive lever 50 rotates in response to the operation button 32 being depressed in the operation direction (negative X-direction), or in other words, a counterclockwise direction about the lever shaft 28 in FIG. 2 is hereafter referred to as a driving direction.

As shown in FIGS. 6A and 6B, the stopper 60 includes a base portion 62, an extension 63, an engagement tab 64, a restraint portion 65, a contact portion 66, and a barrel slider 68.

The base portion 62 has a shaft hole 61 for receiving the stopper shaft 51 in the drive lever 50. The extension 63 extends radially outward from the base portion 62. The engagement tab 64 is located in the positive Y-direction from the extension 63. The restraint portion 65 faces the pusher 55 in the drive lever 50. The contact portion 66 is opposite to the restraint portion 65 in X-direction. The barrel slider 68 slides along an arc-shaped rail 23 in the barrel 22 in the frame 20 (refer to FIG. 3).

The shaft hole 61 in the base portion 62 has two key grooves 61A corresponding to the two keys 51A in the stopper shaft 51 in the drive lever 50. To attach the stopper 60 to the drive lever 50, the keys 51A in the drive lever 50 are placed in the key grooves 61A in the stopper 60, and the stopper 60 is rotated about the stopper shaft 51 in the drive lever 50. This engages the keys 51A in the drive lever 50 with the circumferential surface of the shaft hole 61 in the stopper 60, thus preventing the stopper 60 from separating from the drive lever 50.

The stopper shaft 51 in the drive lever 50 has a length in Y-direction greater than the thickness of the base portion 62 in the stopper 60 in Y-direction, and extends further from the stopper 60 in the positive Y-direction through the shaft hole 61 in the stopper 60. As shown in FIG. 3, a stopper urging spring 70 that is, for example, a helical torsion spring is attached to the stopper shaft 51 extending further from the stopper 60 in the positive Y-direction. In the present embodiment, the stopper urging spring 70 includes a coil 71 surrounding the stopper shaft 51 in the drive lever 50, one arm 72 engaged with the engagement tab 64 in the stopper 60, and another arm 73 engaged with the engagement tab 56 in the drive lever 50.

Figure 8A:
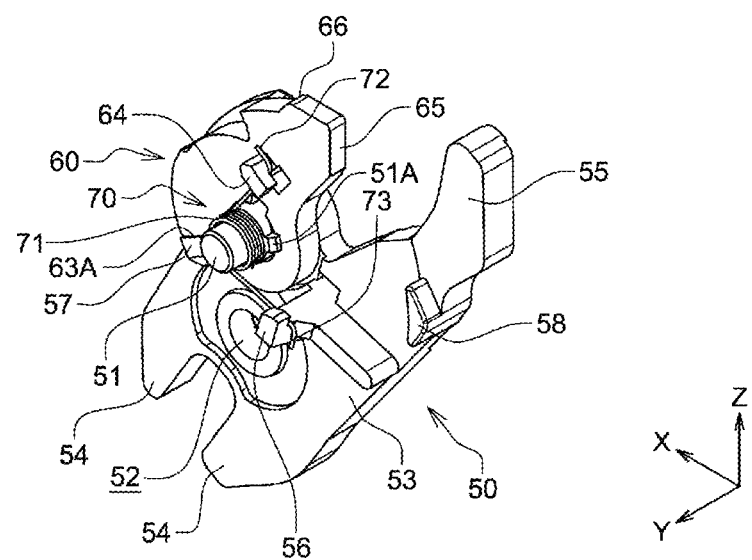
FIG. 8A is a perspective view of the drive lever shown in FIG. 3 with the stopper and a stopper urging spring attached.
Figure 8B:
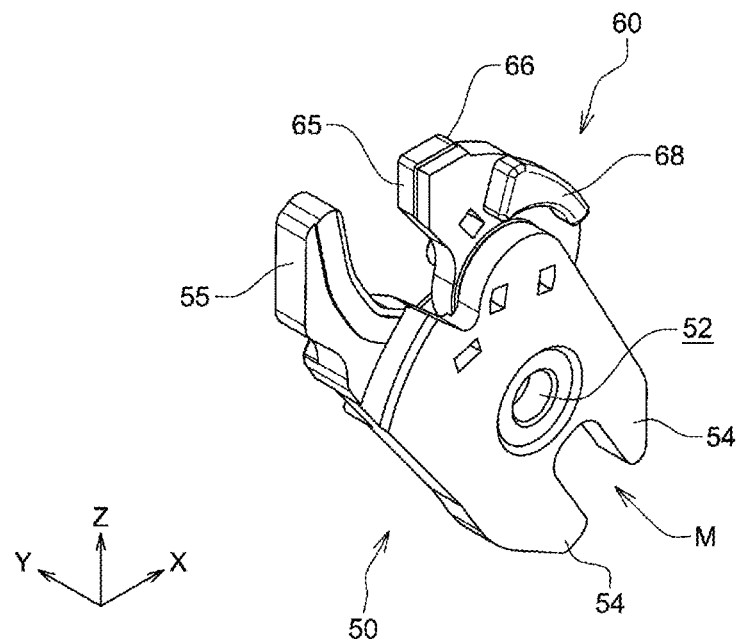
FIG. 8B is a perspective view of the drive lever shown in FIG. 3 with the stopper and the stopper urging spring attached.

FIGS. 8A and 8B are perspective views of the drive lever 50 with the stopper 60 and the stopper urging spring 70 attached. The stopper urging spring 70 extends between the engagement tab 64 in the stopper 60 and the engagement tab 56 in the drive lever 50 to have an opening angle between the arms 72 and 73 smaller than the free angle of the stopper urging spring 70. Thus, the stopper 60 is urged counterclockwise about the stopper shaft 51 in FIG. 8A. The direction in which the stopper 60 is urged, or in other words, a counterclockwise direction about the stopper shaft 51 in FIG. 8A, is hereafter referred to as a stopper urging direction.

The rotation restrictor 57 in the drive lever 50 is located in an area in which the stopper 60 rotates. As the stopper 60 rotates in the stopper urging direction, an edge 63A of the extension 63 in the stopper 60 comes in contact with the rotation restrictor 57 in the drive lever 50. In this manner, the stopper 60 is restricted from rotating in the stopper urging direction by the rotation restrictor 57 in the drive lever 50.

Figure 9A:
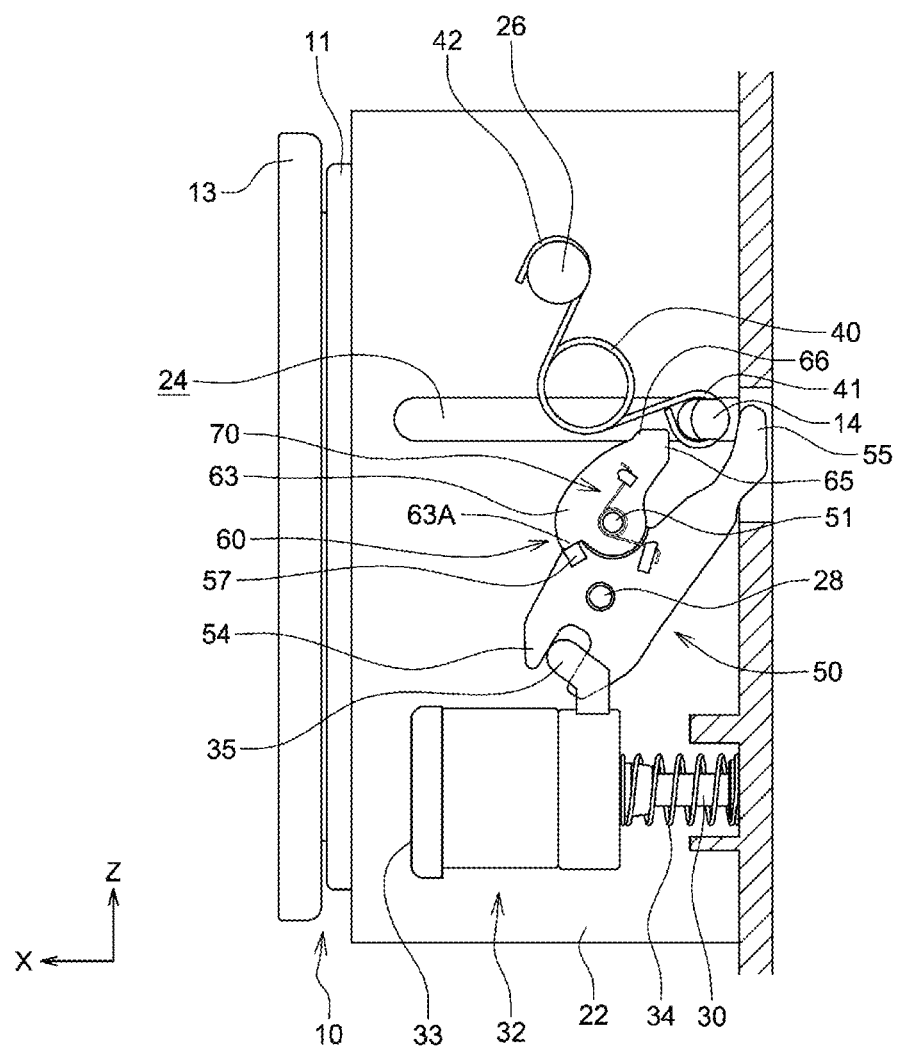
FIG. 9A is a schematic diagram describing the operation of a lens barrel extension assembly in the camera shown in FIG. 1.

FIGS. 9A to 9F are schematic diagrams describing the operation of the lens barrel extension assembly described above, showing each component described above in a simplified manner. FIG. 9A shows the lens barrel 10 in the retracted state (the state shown in FIG. 2). In the retracted state, the operation button 32 is moved in the positive X-direction (button urging direction) under the urging force from the button urging spring 34, and the drive lever 50 with its holding pieces 54 engaged with the hook 35 in the operation button 32 is at the position shown in FIG. 9A. The position of the drive lever 50 shown in FIG. 9A is hereafter referred to as an initial position.

In the retracted state, the lens barrel 10 is moved to its farthest extent in the negative X-direction and accommodated in the barrel 22. The engagement protrusion 14 on the lens barrel 10 is at its farthest extent in the negative X-direction. As shown in FIG. 9A, the pusher 55 in the drive lever 50 at the initial position is located farther in the negative X-direction than the engagement protrusion 14 on the lens barrel 10.

The stopper 60 is urged by the stopper urging spring 70 described above in the stopper urging direction with the edge 63A of the extension 63 in the stopper 60 in contact with the rotation restrictor 57 in the drive lever 50. In this state, at least a part of the restraint portion 65 and at least a part of the contact portion 66 in the stopper 60 overlap the guide groove 24 on the barrel 22 on an XZ plane as shown in FIG. 9A. More specifically, at least a part of the restraint portion 65 and at least a part of the contact portion 66 in the stopper 60 are to be on a path on which the engagement protrusion 14 on the lens barrel 10 moves along the guide groove 24.

In the state shown in FIG. 9A, the arm 41 of the switch spring 40 engaged with the engagement protrusion 14 on the lens barrel 10 is located farther in the negative X-direction than the arm 42. This causes the urging force from the switch spring 40 in the negative X-direction to act on the engagement protrusion 14, preventing the engagement protrusion 14 from moving in the positive X-direction. Thus, the engagement protrusion 14 is retained at the position shown in FIG. 9A under normal conditions. However, when the lens barrel 10 receives a force in the positive X-direction exceeding the urging force from the switch spring 40 in the negative X-direction resulting from, for example, an external impact, the engagement protrusion 14 moves in the positive X-direction against the urging force from the switch spring 40. In this case, in the present embodiment, the engagement protrusion 14 on the lens barrel 10 comes in contact with the restraint portion 65 in the stopper 60 and is restricted from moving in the positive X-direction. This prevents the lens barrel 10 from extending in the positive X-direction accidentally. This prevents the camera 1 from being turned on accidentally, thus reducing consumption of the battery of the camera 1.

Figure 9B:
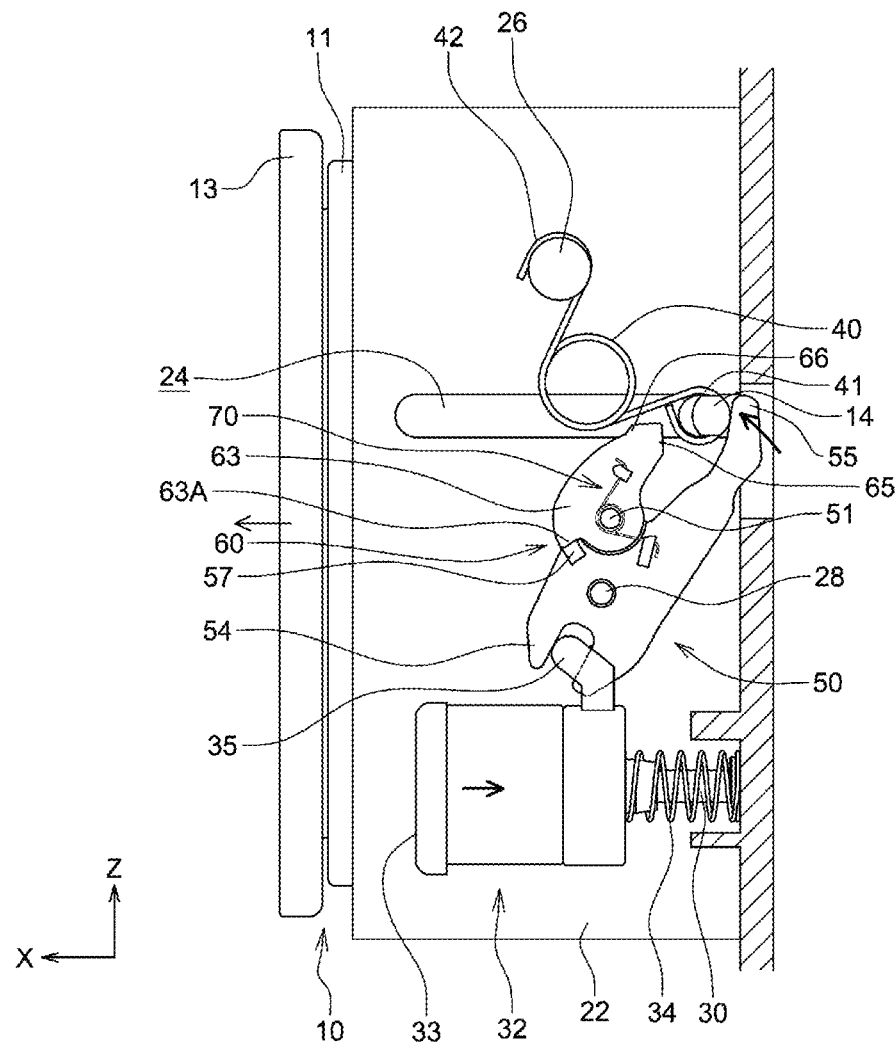
FIG. 9B is a schematic diagram describing the operation of the lens barrel extension assembly in the camera shown in FIG. 1.

In the state shown in FIG. 9A, when the user depresses the operation button 32 in the negative X-direction (operation direction) against the urging force from the button urging spring 34 as shown in FIG. 9B, the drive lever 50 with its holding pieces 54 engaged with the hook 35 in the operation button 32 rotates counterclockwise (hereafter, the driving direction) about the lever shaft 28 as the operation button 32 moves in the negative X-direction. This causes the pusher 55 in the drive lever 50 to come in contact with the engagement protrusion 14. The engagement protrusion 14 (and the lens barrel 10) is thus pushed in the positive X-direction (extension direction) as the drive lever 50 rotates. The stopper 60 is urged by the stopper urging spring 70 in the stopper urging direction and rotates integrally with the drive lever 50 with the edge 63A of the extension 63 in the stopper 60 in contact with the rotation restrictor 57 in the drive lever 50.

Figure 9C:
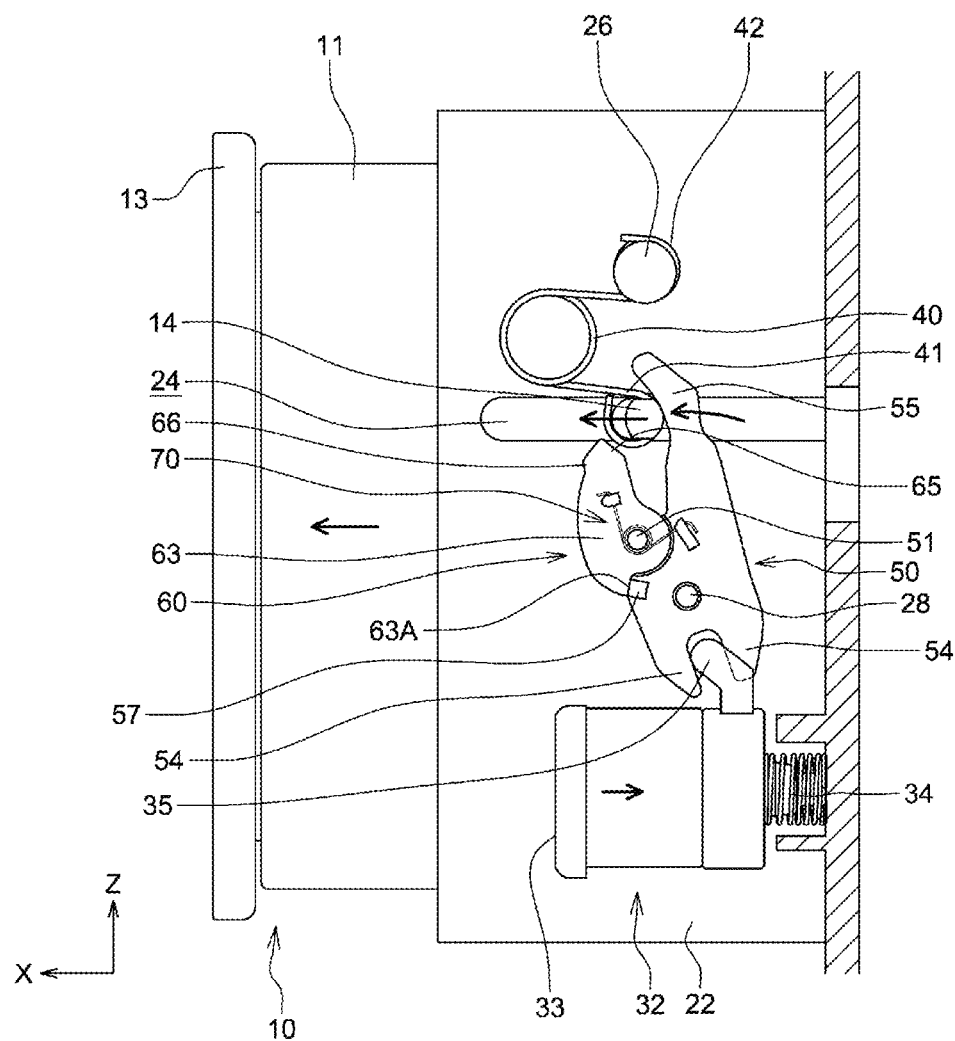
FIG. 9C is a schematic diagram describing the operation of the lens barrel extension assembly in the camera shown in FIG. 1.

In this manner, when the drive lever 50 rotates in the driving direction in response to the operation button 32 being depressed, the restraint portion 65 and the contact portion 66 in the stopper 60 that rotates integrally with the drive lever 50 no longer overlap the guide groove 24 on the barrel 22 on the XZ plane as shown in FIG. 9C. More specifically, the restraint portion 65 and the contact portion 66 in the stopper 60 are retracted from the path of the engagement protrusion 14 on the lens barrel 10. In the present embodiment, as shown in FIG. 9C, the restraint portion 65 and the contact portion 66 in the stopper 60 are retracted from the path of the engagement protrusion 14 on the lens barrel 10 when the engagement protrusion 14 is, in X-direction, at a position substantially aligned with the position of the spring engagement portion 26 in X-direction, or in other words, when the arms 41 and 42 of the switch spring 40 are at positions substantially aligned with each other in X-direction. The position of the engagement protrusion 14, when the arms 41 and 42 of the switch spring 40 are at positions aligned with each other in X-direction as shown in FIG. 9C, is referred to as a reference position.

Figure 9D:
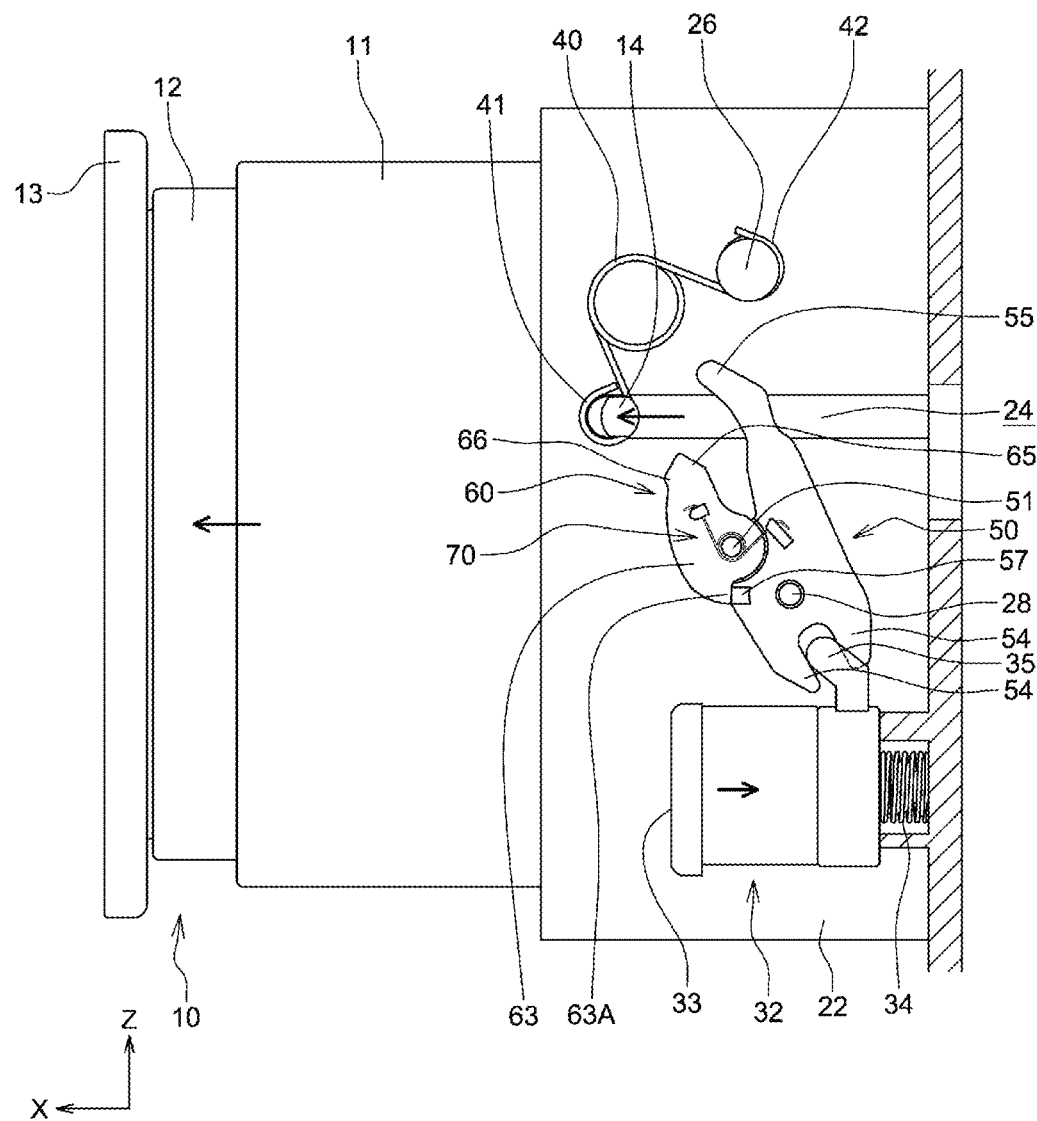
FIG. 9D is a schematic diagram describing the operation of the lens barrel extension assembly in the camera shown in FIG. 1.

When the drive lever 50 in the state shown in FIG. 9C rotates further in the driving direction, the arm 41 of the switch spring 40 moves farther in the positive X-direction than the arm 42. This causes the urging force from the switch spring 40 in the positive X-direction to act on the engagement protrusion 14 on the lens barrel 10. Thus, as shown in FIG. 9D, the engagement protrusion 14 moves in the positive X-direction (extension direction) under the urging force from the switch spring 40 in the positive X-direction, without being pushed by the pusher 55 in the drive lever 50, and eventually moves to the end of the guide groove 24 in the positive X-direction, separating from the pusher 55 in the drive lever 50. In this case, the restraint portion 65 and the contact portion 66 in the stopper 60 are retracted from the path of the engagement protrusion 14 as described above. The engagement protrusion 14 can thus move to the end of the guide groove 24 in the positive X-direction without being obstructed by the restraint portion 65 in the stopper 60. In response to the engagement protrusion 14 moving to the end of the guide groove 24 in the positive X-direction, the switch assembly (not shown) turns on the camera 1, permitting photographing with the camera 1. As described above, a moving assembly (not shown) moves the second cylinder 12 in the lens barrel 10 in the positive X-direction relative to the first cylinder 11 while the lens barrel 10 in the state shown in FIG. 9C changes into the state shown in FIG. 9D, thus causing the lens barrel 10 to extend in X-direction.

Figure 9E:
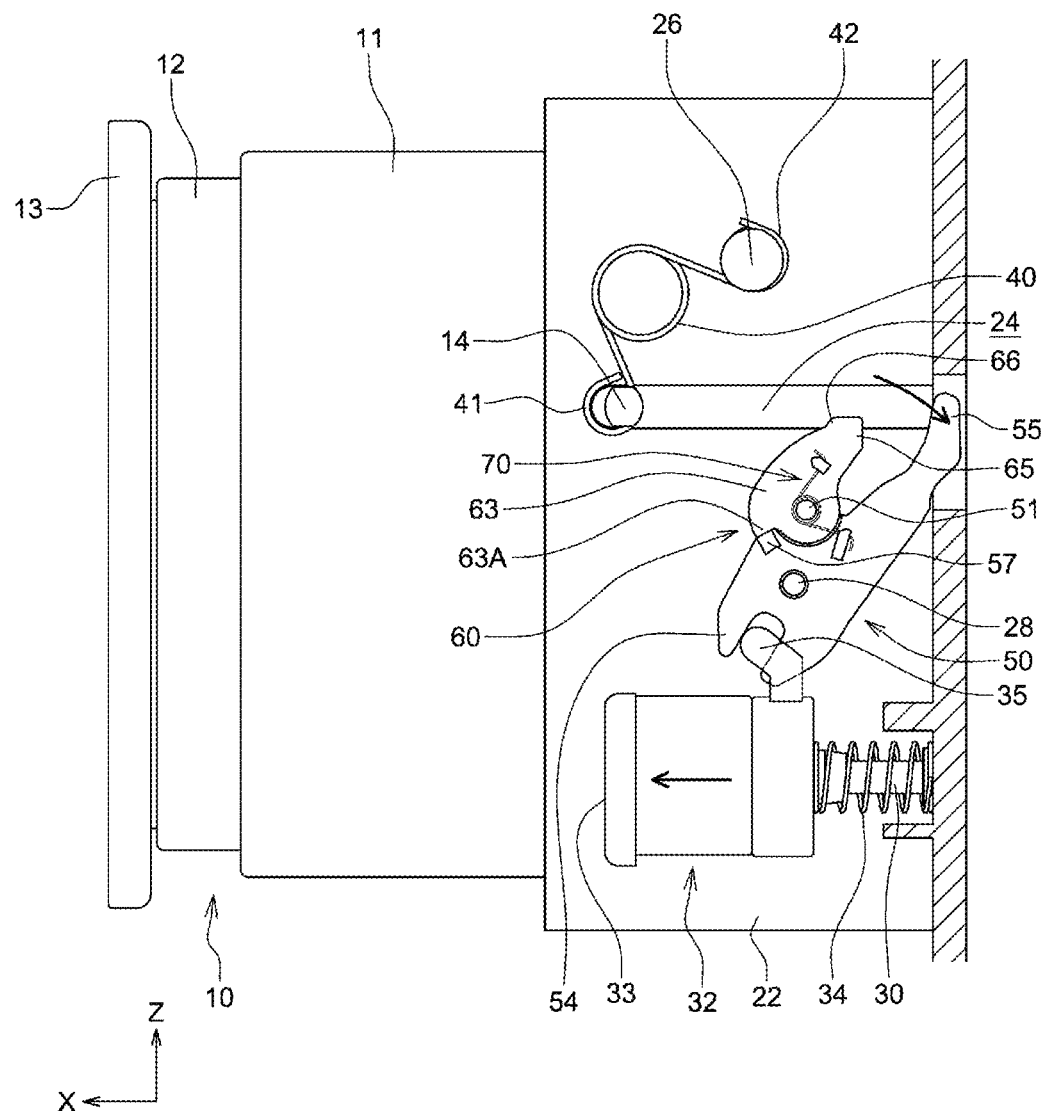
FIG. 9E is a schematic diagram describing the operation of the lens barrel extension assembly in the camera shown in FIG. 1.

In the state shown in FIG. 9D, when the user releases the operation button 32, the operation button 32 moves in the positive X-direction under the urging force from the button urging spring 34 as shown in FIG. 9E. As the operation button 32 moves in the positive X-direction, the drive lever 50 with its holding pieces 54 engaged with the hook 35 in the operation button 32 rotates clockwise about the lever shaft 28 to return to the initial position described above. In this state, as described above, at least a part of the restraint portion 65 and at least a part of the contact portion 66 in the stopper 60 are on the path of the engagement protrusion 14 on the lens barrel 10.

The switch assembly described above is activated to turn off the camera 1 when the user moves the lens barrel 10 in the negative X-direction after photographing with the camera 1. When the user pushes the lens barrel 10 (e.g., the third cylinder 13) in the negative X-direction, the engagement protrusion 14 on the lens barrel 10 also moves in the negative X-direction (retraction direction). As described above, the engagement protrusion 14 receives a force from the switch spring 40 in the positive X-direction until it moves to the reference position described above. Thus, the user is to push the lens barrel 10 in the negative X-direction against the urging force from the switch spring 40.

When the engagement protrusion 14 moves beyond the reference position in the negative X-direction in response to the lens barrel 10 being pushed by the user in the negative X-direction, the urging direction of the switch spring 40 is reversed. The engagement protrusion 14 receives a force from the switch spring 40 in the negative X-direction. Thus, the engagement protrusion 14 moves in the negative X-direction (retraction direction) under the urging force from the switch spring 40 in the negative X-direction, without the lens barrel 10 being pushed by the user in the negative X-direction.

Figure 9F:
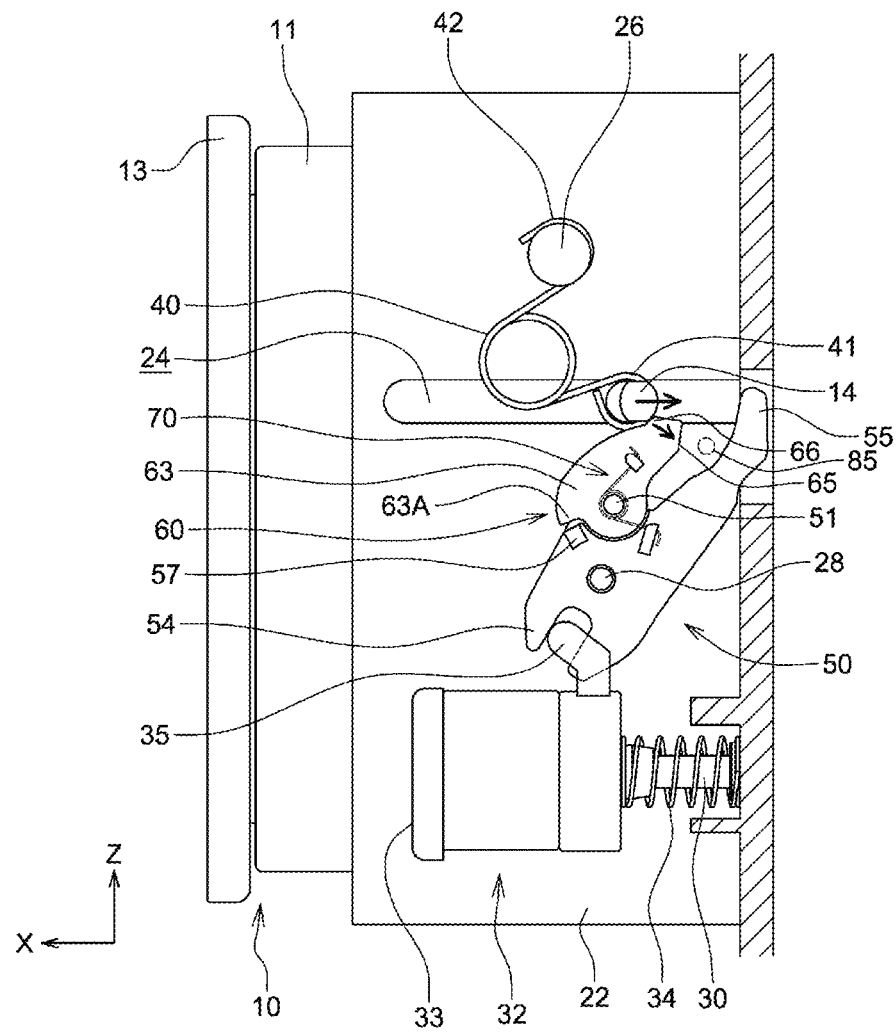
FIG. 9F is a schematic diagram describing the operation of the lens barrel extension assembly in the camera shown in FIG. 1.

In this case, at least a part of the contact portion 66 in the stopper 60 is on the path of the engagement protrusion 14 on the lens barrel 10. The engagement protrusion 14 thus comes in contact with the contact portion 66 in the stopper 60 while moving in the negative X-direction. The stopper 60, which is urged by the stopper urging spring 70 in the stopper urging direction, additionally receives the urging force from the switch spring 40 (and a force from the user applied to the lens barrel 10, as appropriate) on its contact portion 66 through the engagement protrusion 14. The stopper 60 thus rotates clockwise about the stopper shaft 51 in the drive lever 50 against the urging force from the stopper urging spring 70 as shown in FIG. 9F. This moves the engagement protrusion 14 over the contact portion 66 in the stopper 60 in the negative X-direction.

After moving over the contact portion 66 in the stopper 60, the engagement protrusion 14 on the lens barrel 10 moves further in the negative X-direction under the urging force from the switch spring 40 in the negative X-direction. The stopper 60 rotates counterclockwise (stopper urging direction) about the stopper shaft 51 under the urging force from the stopper urging spring 70 until the edge 63A of the extension 63 in the stopper 60 comes in contact with the rotation restrictor 57 in the drive lever 50. Thus, at least a part of the restraint portion 65 and at least a part of the contact portion 66 in the stopper 60 are moved onto the path of the engagement protrusion 14 again, returning to the above state (retracted state) shown in FIG. 9A.

The stopper 60 may rotate to excess in a direction opposite to the stopper urging direction when, for example, the lens barrel 10 is abruptly depressed in the negative X-direction. In the present embodiment, as shown in FIG. 9F, the stopper engagement portion 85 in the cover plate 80 is on a path on which the stopper 60 moves (rotates). This allows the stopper 60 to engage with the stopper engagement portion 85 in the cover plate 80, thus restricting excess rotation of the stopper 60. This prevents the stopper 60 from rotating to excess to align the key grooves 61A in the stopper 60 with the keys 51A in the drive lever 50. This prevents the keys 51A in the drive lever 50 from being disengaged from the circumferential surface of the shaft hole 61 in the stopper 60 to cause the stopper 60 to separate from the drive lever 50.

As described above, the switch spring 40 in the present embodiment urges the engagement protrusion 14 on the lens barrel 10 in the positive X-direction when the engagement protrusion 14 is at a position farther in the positive X-direction (extension direction) than the reference position described above, and urges the engagement protrusion 14 in the negative X-direction when the engagement protrusion 14 is at a position farther in the negative X-direction (retraction direction) than the reference position. As the drive lever 50 rotates in the driving direction in response to the operation button 32 being depressed, the pusher 55 in the drive lever 50 pushes the engagement protrusion 14 on the lens barrel 10 in the positive X-direction to move the engagement protrusion 14 farther in the positive X-direction (extension direction) than the reference position described above. With the drive lever 50 at the initial position described above, the restraint portion 65 in the stopper 60 is on the path of the engagement protrusion 14 along the guide groove 24 on the barrel 22, restraining movement of the engagement protrusion 14 in the positive X-direction (extension direction).

In this structure, when the lens barrel 10 moves in the positive X-direction under a large force applied to the lens barrel 10 in the positive X-direction (extension direction) upon receiving, for example, an external impact, the engagement protrusion 14 on the lens barrel 10 comes in contact with the restraint portion 65 in the stopper 60 and is restricted from moving in the positive X-direction. This prevents the lens barrel 10 from extending in the positive X-direction accidentally. This prevents damage to the lens barrel 10 and consumption of the battery resulting from the lens barrel 10 extending accidentally.

In the present embodiment, the restraint portion 65 in the stopper 60 comes in contact with the engagement protrusion 14 on the lens barrel 10 on its flat surface as shown in FIG. 9A. In this case, the contact area between the restraint portion 65 in the stopper 60 and the engagement protrusion 14 on the lens barrel 10 can be increased, thus more effectively restraining the engagement protrusion 14 on the lens barrel 10 from moving in the positive X-direction.

In the above embodiment, the stopper 60 is urged by the stopper urging spring 70 in the stopper urging direction. Thus, when the engagement protrusion 14 on the lens barrel 10 moving in the negative X-direction (retraction direction) comes in contact with the contact portion 66 in the stopper 60, the stopper 60 rotates about the stopper shaft 51 in the drive lever 50 against the urging force from the stopper urging spring 70. This allows the engagement protrusion 14 to move over the contact portion 66 in the stopper 60 and to a position between the restraint portion 65 in the stopper 60 and the pusher 55 in the drive lever 50 into the retracted state. In this case, to reduce a frictional force between the engagement protrusion 14 and the contact portion 66 in the stopper 60, the contact portion 66 in the stopper 60 may come in contact with the engagement protrusion 14 on its curved surface as shown in FIG. 9F.

In the above embodiment, the plate slider 58 in the drive lever 50 slides along the arc-shaped rail 82 in the cover plate 80, and the barrel slider 68 in the stopper 60 slides along the arc-shaped rail 23 in the barrel 22 in the frame 20. During the extension operation and the retraction operation described above, the plate slider 58 in the drive lever 50 moves while sliding along the rail 82 in the cover plate 80, and the barrel slider 68 in the stopper 60 moves while sliding along the rail 23 in the barrel 22. This prevents the drive lever 50 and the stopper 60 from rattling between the cover plate 80 and the barrel 22.

Although the lens barrel 10 is extendable in the positive X-direction in the above embodiment, the lens barrel 10 may not be extendable. With the lens barrel 10 extendable in the positive X-direction, the camera 1 can be thinner in X-direction in the retracted state.

Although the lens barrel extension assembly in the above embodiment includes a single drive lever 50 and a single stopper 60, the lens barrel extension assembly may include multiple sets of the drive levers 50 and the stoppers 60 in accordance with the number of engagement protrusions 14. For example, multiple sets of the drive levers 50 and the stoppers 60 can be operated in a cooperative manner with a lever or a link. For example, for a heavy lens barrel 10, a single stopper 60 may not restrain the lens barrel 10 from moving upon receiving an external impact, and with a single drive lever 50, a single engagement protrusion 14 alone receives a load from the drive lever 50, easily reducing the durability of the engagement protrusion 14. In this case, multiple sets of the drive levers 50 and the stoppers 60 may be included.

The terms front, frontward, rear, rearward, up, upward, down, downward, and other terms used herein to indicate the positional relationships are used in connection with the illustrated embodiment and are thus changeable depending on the relative positional relationship in the device.

Although the embodiments of the present invention have been described above, the present invention is not limited to the above embodiments and may be modified variously within the scope of its technical idea.

As described above, a camera according to the above aspects of the present invention prevents a lens barrel from extending accidentally upon receiving, for example, an external impact. The camera includes a barrel having a guide groove extending in an optical axis direction, and a lens barrel accommodated in the barrel in a retracted state and movable in an extension direction parallel to the optical axis direction. The lens barrel includes an engagement protrusion protruding radially outward and engaged with the guide groove on the barrel. The camera further includes a switch spring extending between a spring engagement portion in the barrel and the engagement protrusion on the lens barrel, a drive lever rotatable about a lever shaft in the barrel, a stopper rotatable about a stopper shaft in the drive lever, a stopper urging spring urging the stopper in a stopper urging direction, an operation member movable in an operation direction, and a button urging spring urging the operation member in a direction opposite to the operation direction. The operation member moves in the operation direction to rotate the drive lever at an initial position in a driving direction. The switch spring urges the engagement protrusion on the lens barrel in the extension direction when the engagement protrusion on the lens barrel is at a position farther in the extension direction than a reference position, and urges the engagement protrusion on the lens barrel in a retraction direction opposite to the extension direction when the engagement protrusion on the lens barrel is at a position farther in the retraction direction than the reference position. The drive lever includes a pusher that pushes the engagement protrusion on the lens barrel in the extension direction and a rotation restrictor that restricts rotation of the stopper in the stopper urging direction. The pusher in the drive lever pushes the engagement protrusion on the lens barrel in the extension direction to move the engagement protrusion farther in the extension direction than the reference position as the drive lever rotates in the driving direction in response to the operation member being depressed. The stopper includes a restraint portion that is to be on a path of the engagement protrusion on the lens barrel along the guide groove on the barrel to restrain movement of the engagement protrusion on the lens barrel in the extension direction when the drive lever is at the initial position.

In this structure, when the lens barrel moves in the extension direction under a large force applied to the lens barrel upon receiving, for example, an external impact, the engagement protrusion on the lens barrel comes in contact with the restraint portion in the stopper and is restricted from moving in the extension direction. This prevents the lens barrel from extending in the extension direction accidentally. This prevents damage to the lens barrel and consumption of the battery resulting from the lens barrel extending accidentally.

The restraint portion in the stopper may retract from the path of the engagement protrusion on the lens barrel in response to the drive lever rotating in the driving direction. In this case, the engagement protrusion on the lens barrel can move in the extension direction without being obstructed by the restraint portion in the stopper after the restraint portion in the stopper retracts from the path of the engagement protrusion on the lens barrel.

In particular, the restraint portion in the stopper may retract from the path of the engagement protrusion on the lens barrel in response to the engagement protrusion on the lens barrel moving to the reference position. In this case, the engagement protrusion on the lens barrel can move in the extension direction without being obstructed by the restraint portion in the stopper after moving to the reference position.

The restraint portion in the stopper may come in contact with the engagement protrusion on the lens barrel on a flat surface. In this case, a contact area between the restraint portion in the stopper and the engagement protrusion on the lens barrel can be increased, thus more effectively restraining the engagement protrusion on the lens barrel from moving in the extension direction.

The stopper may further include a contact portion that is to be on the path of the engagement protrusion on the lens barrel along the guide groove on the barrel to come in contact with the engagement protrusion on the lens barrel moving in the retraction direction when the drive lever is at the initial position. As described above, when the engagement protrusion on the lens barrel moving in the retraction direction comes in contact with the contact portion in the stopper, which is urged by the stopper urging spring in the stopper urging direction, the stopper rotates about the stopper shaft in the drive lever against the urging force from the stopper urging spring. This allows the engagement protrusion to move over the contact portion in the stopper and to a position between the restraint portion in the stopper and the pusher in the drive lever into the retracted state.

In this case, to reduce a frictional force between the engagement protrusion on the lens barrel and the contact portion in the stopper, the contact portion in the stopper may come in contact with the engagement protrusion on a curved surface.

The operation member may include a lever engagement portion engaged with the drive lever to rotate the drive lever about the lever shaft.

The stopper shaft in the drive lever may include a key protruding radially outward. The stopper may have a key groove corresponding to the key in the drive lever. In this structure, to attach the stopper to the drive lever, the key in the drive lever is placed in the key groove in the stopper, and the stopper is rotated about the stopper shaft in the drive lever. This engages the key in the drive lever with the circumferential surface of a shaft hole in the stopper. Thus, the stopper is less likely to separate from the drive lever.

The stopper urging spring may be a coil spring including a coil surrounding the stopper shaft in the drive lever, an arm engaged with the stopper, and an arm engaged with the drive lever.

The camera may further include a cover plate that fixes the drive lever and the stopper between the cover plate and the barrel. In this case, the cover plate may include a stopper engagement portion engageable with the stopper and may restrict excess rotation of the stopper in a direction opposite to the stopper urging direction with the stopper engagement portion.

To prevent the drive lever and the stopper from rattling between the cover plate and the barrel, the drive lever may include a plate slider that slides along a part of the cover plate, and the stopper may include a barrel slider that slides along a part of the barrel.

The camera according to the above aspects of the present invention causes the engagement protrusion on the lens barrel to come in contact with the restraint portion in the stopper to be restricted from moving in the extension direction when the lens barrel moves in the extension direction under a large force applied to the lens barrel upon receiving, for example, an external impact. This prevents the lens barrel from extending in the extension direction accidentally. This prevents damage to the lens barrel and consumption of the battery resulting from the lens barrel extending accidentally.

This application claims priority to Japanese Patent Application No. 2019-228884 filed on Dec. 19, 2019, the entire disclosure of which is incorporated herein by reference.

INDUSTRIAL APPLICABILITY

The camera according to one or more embodiments of the present invention is suitably used as a camera that allows a lens barrel to extend frontward in an optical axis direction.

The invention claimed is:

1. A camera, comprising:
    a barrel having a guide groove extending in an optical axis direction;
    a lens barrel accommodated in the barrel in a retracted state and movable in an extension direction parallel to the optical axis direction, the lens barrel including an engagement protrusion protruding radially outward and engaged with the guide groove on the barrel;
    a switch spring extending between a spring engagement portion in the barrel and the engagement protrusion on the lens barrel;
    a drive lever rotatable about a lever shaft in the barrel;
    a stopper rotatable about a stopper shaft in the drive lever;
    a stopper urging spring urging the stopper in a stopper urging direction;
    an operation member movable in an operation direction, the operation member being configured to move in the operation direction to rotate the drive lever at an initial position in a driving direction; and
    a button urging spring urging the operation member in a direction opposite to the operation direction,
    wherein the switch spring urges the engagement protrusion on the lens barrel in the extension direction when the engagement protrusion on the lens barrel is at a position farther in the extension direction than a reference position, and urges the engagement protrusion on the lens barrel in a retraction direction opposite to the extension direction when the engagement protrusion on the lens barrel is at a position farther in the retraction direction than the reference position,
    the drive lever includes a pusher configured to push the engagement protrusion on the lens barrel in the extension direction and a rotation restrictor configured to restrict rotation of the stopper in the stopper urging direction,
    the pusher in the drive lever pushes the engagement protrusion on the lens barrel in the extension direction to move the engagement protrusion farther in the extension direction than the reference position as the drive lever rotates in the driving direction in response to the operation member being depressed, and
    the stopper includes a restraint portion configured to be on a path of the engagement protrusion on the lens barrel along the guide groove on the barrel to restrain movement of the engagement protrusion on the lens barrel in the extension direction when the drive lever is at the initial position.

2. The camera according to claim 1, wherein the restraint portion in the stopper retracts from the path of the engagement protrusion on the lens barrel as the drive lever rotates in the driving direction.

3. The camera according to claim 2, wherein the restraint portion in the stopper retracts from the path of the engagement protrusion on the lens barrel in response to the engagement protrusion on the lens barrel moving to the reference position.

4. The camera according to claim 1, wherein the restraint portion in the stopper comes in contact with the engagement protrusion on the lens barrel on a flat surface.

5. The camera according to claim 1, wherein the stopper further includes a contact portion configured to be on the path of the engagement protrusion on the lens barrel along the guide groove on the barrel to come in contact with the engagement protrusion on the lens barrel moving in the retraction direction when the drive lever is at the initial position.

6. The camera according to claim 5, wherein the contact portion in the stopper comes in contact with the engagement protrusion on the lens barrel on a curved surface.

7. The camera according to claim 1, wherein the operation member includes a lever engagement portion engaged with the drive lever to rotate the drive lever about the lever shaft.

8. The camera according to claim 1, wherein the stopper shaft in the drive lever includes a key protruding radially outward, and the stopper has a key groove corresponding to the key in the drive lever.

9. The camera according to claim 1, wherein the stopper urging spring includes a coil spring including a coil surrounding the stopper shaft in the drive lever, an arm engaged with the stopper, and an arm engaged with the drive lever.

10. The camera according to claim 1, further comprising:
    a cover plate fixing the drive lever and the stopper between the cover plate and the barrel.

11. The camera according to claim 10, wherein the cover plate includes a stopper engagement portion engageable with the stopper, and the stopper engagement portion restricts excess rotation of the stopper in a direction opposite to the stopper urging direction.

12. The camera according to claim 10, wherein the drive lever further includes a plate slider slidable along a part of the cover plate.

13. The camera according to claim 10, wherein the stopper further includes a barrel slider slidable along a part of the barrel.

* * * * *